United States Patent [19]

Lisak et al.

[11] Patent Number: 4,956,942
[45] Date of Patent: Sep. 18, 1990

[54] WINDOW ADJUSTMENT MECHANISM

[75] Inventors: Stephen P. Lisak; Harold L. Purdy, both of Arab, Ala.

[73] Assignee: Textron Inc., Rockford, Ill.

[21] Appl. No.: 364,012

[22] Filed: Jun. 9, 1989

[51] Int. Cl.⁵ .............................................. B60J 1/00
[52] U.S. Cl. .......................................... 49/502; 49/212
[58] Field of Search .................. 49/374, 502, 212, 227, 49/341, 342, 343; 74/416; 411/301; 292/DIG. 38; 248/221.4; 403/12

[56] References Cited

U.S. PATENT DOCUMENTS

| | | | |
|---|---|---|---|
| 229,179 | 6/1880 | Prall | 49/343 |
| 1,101,257 | 6/1914 | Dawson | 49/341 |
| 2,733,484 | 2/1956 | Jedlicka | 49/343 X |
| 3,255,795 | 6/1966 | Ginsburg | 411/301 |
| 3,357,134 | 12/1967 | Genord | 49/227 x |
| 3,674,018 | 6/1987 | Ryder et al. | 363/424 |
| 3,674,295 | 7/1972 | Padovani | 292/DIG. 38 X |
| 3,844,064 | 10/1974 | Yamaha | 49/227 X |
| 4,261,479 | 4/1981 | Caserta | 292/DIG. 38 X |
| 4,329,886 | 5/1982 | Branstner | 74/416 |
| 4,713,739 | 12/1987 | Ryder et al. | 363/424 |
| 4,761,915 | 8/1988 | März | 49/502 X |
| 4,860,493 | 8/1989 | Lense | 49/341 X |

*Primary Examiner*—Philip C. Kannan
*Assistant Examiner*—Jerry Redman

[57] ABSTRACT

A window adjustment apparatus is provided for use with an automotive vehicle type of window assembly of the type having an elongate guide channel defining a longitudinal axis and which mounts a window for reciprocal motion relative to a vehicle body panel such as a vehicle door, and a pivot arrangement which mounts the guide channel for pivotal movement generally about one end thereof and within the vehicle body panel in which the guide channel is located. The window adjustment apparatus includes a housing and an adjustment member having a channel-coupling portion or coupling thereof to the guide channel at a location thereon generally remotely located from the end about which the guide channel is mounted for pivotal motion. A driven member is mounted to the adjustment member and a drive member is rotatably mounted to the housing, and is of complementary form with the driven member for engaging the same for causing bidirectional movement of the adjustment member relative to the housing to achieve this bidirectional movement of the guide-channel in response to bidirectional rotation of the drive member. An engageable member is accessible for engagement and bidirectional rotation from exteriorly of the body panel, such that bidirectional rotation of the engageable member achieves a predetermined and corresponding amount of bidirectional, pivotal motion of the guide channel.

13 Claims, 3 Drawing Sheets

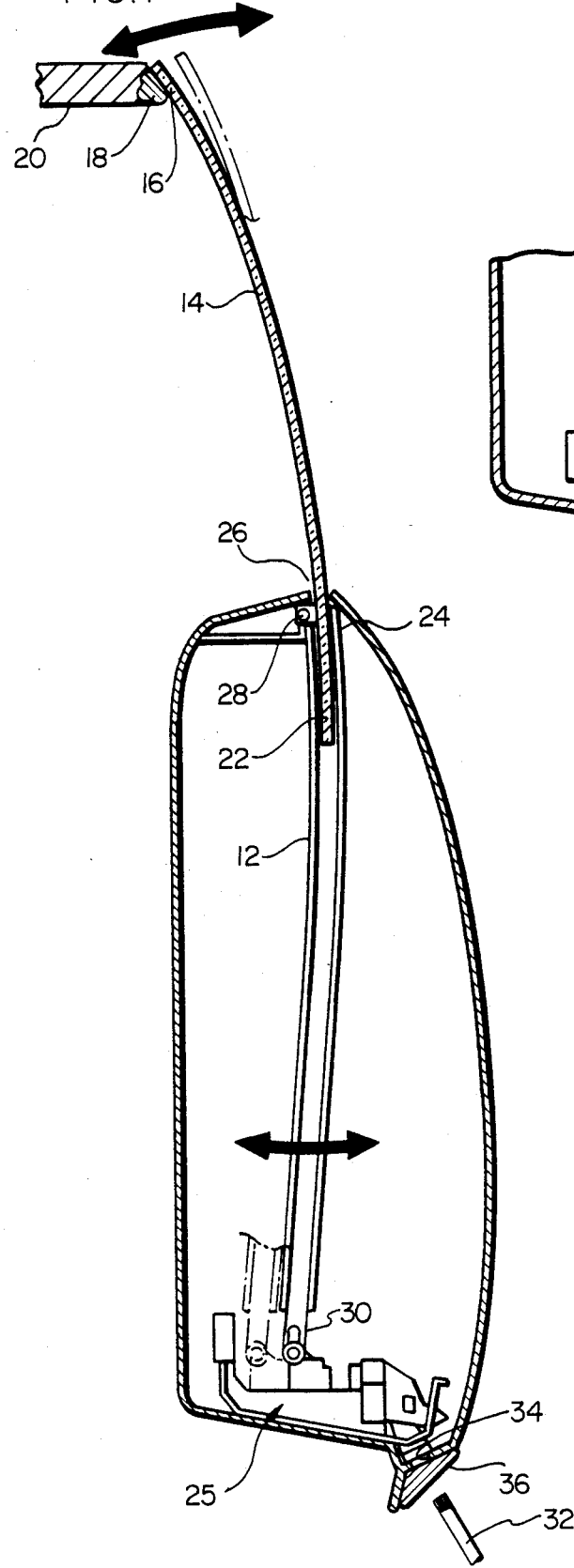
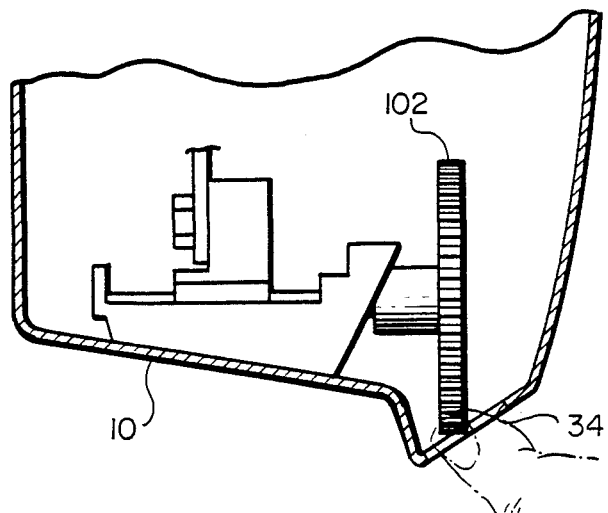
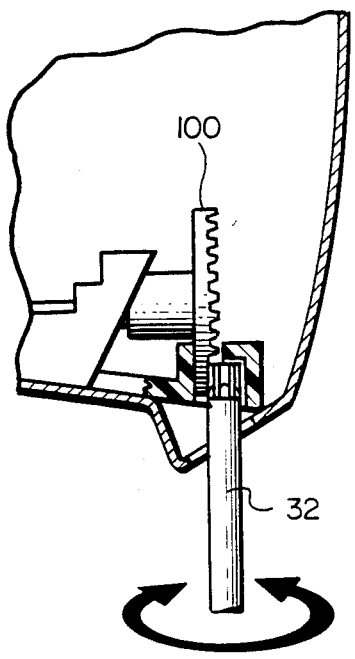

WINDOW ADJUSTMENT MECHANISM

BACKGROUND OF THE INVENTION

This application is directed generally to the automotive vehicle arts, and more particularly to a window adjustment assembly for adjusting the tilt or angle of a window of an automotive vehicle relative to a body panel or door panel of the vehicle.

The present invention is directed to apparatus particularly suited for use in so-called frameless vehicle windows. Such windows are commonly found in automotive vehicles such as passenger automobiles which are provided with convertible tops or in the so-called hardtop or coupe style. In such vehicles, the upper portion of the door or other body panel does not completely frame the window. In fact, it is common to provide no frame whatever for the window when the same is fully raised relative to the door or other body panel. However, it is desirable that the window properly mate with and/or seal with gaskets or the like which are provided in the vehicle roof or top, whether the top is of the convertible variety or of fixed variety.

In order to facilitate assembly line manufacture in an economical manner, it is therefore desirable to have some means of adjusting the window position relative to the door or other body panel and relative to the mating gasket or other member located on the roof or top portion of the vehicle. Such adjustment may take the form of a pivotal mounting of a door track or guide channel component and some means to adjust the angle or pivot of the same to assure that the window reliably meets and seats against the desired gasket or other component when fully extended or raised.

It may further be desirable to provide for post-assembly adjustment in a similar manner. That is, should the window after some period of use become slightly misaligned, some means may further be provided to realign or correct the alignment thereof. Such a window adjustment apparatus may be provided in such a manner that it is accessible only to service personnel using specialized tools or the like. Alternatively, such an adjustment mechanism may be configured so as to be accessible to the vehicle owner for adjustment as necessary.

OBJECTS AND SUMMARY OF THE INVENTION

Accordingly, it is a general object of this invention to provide a novel and improved window adjustment apparatus for an automotive vehicle window.

A more particular object is to provide a window adjustment apparatus which provides for adjustment of the automotive vehicle window both upon initial assembly, and thereafter in use.

Briefly, in accordance with the foregoing discussion, a window adjustment apparatus is provided for use with an automotive vehicle type of window assembly of the type having an elongate guide channel defining a longitudinal axis and which mounts a window such as a vehicle door, and a pivot arrangement which mounts said guide channel for pivotal movement generally about one end thereof and within said vehicle body panel in which said guide channel is located. The window adjustment apparatus comprises housing means; an adjustment member having channel-coupling means for coupling thereof to said guide channel at a location thereon generally remotely located from the end about which said guide channel is mounted for pivotal motion; a driven member mounted to said adjustment member; drive means rotatably mounted to said housing, said drive means being of complementary form with said driven member for engaging the same for causing bidirectional movement of said adjustment member relative to said housing to achieve said bidirectional pivoting of said guide channel in response to bidirectional rotation of the drive means; said drive means further including engageable means for engagement and bidirectional rotation by means acting from exteriorly of the body panel, such that bidirectional rotation of the engageable means head portion achieves a predetermined and corresponding amount of bidirectional pivotal motion of the guide channel.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawing in which like reference numerals identify like elements, and in which:

FIG. 1 is a sectional view of an automotive body panel such as a door having a window provided with an adjustment apparatus in accordance with the invention;

Fig. 5 is a partial sectional view of a further window adjustment apparatus in accordance with an alternate form of the invention; and Fig. 6 is a further sectional view of yet a further form of window adjustment apparatus in accordance with a further alternate embodiment of the invention.

DETAILED DESCRIPTION OF THE ILLUSTRATED EMBODIMENT

Figure 2:
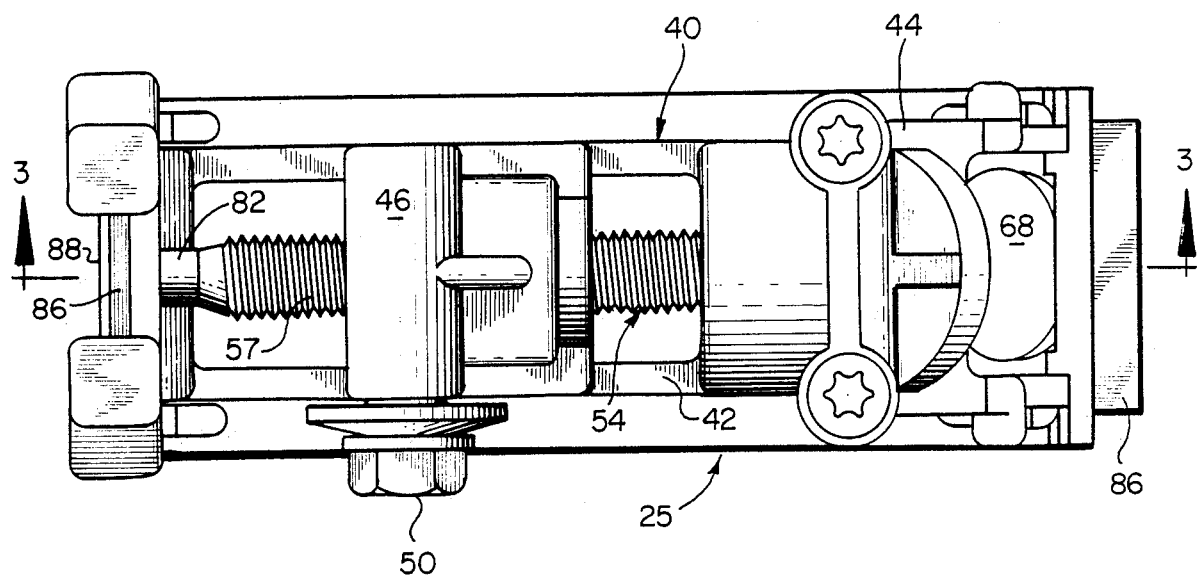
FIG. 2 is an enlarged top plan view of the adjustment apparatus of FIG. 1.

Referring now to the drawings and initially to FIG. 1, there is shown an automotive vehicle body panel such as a door 10. This door 10 mounts a track or guide channel 12 which in turn slidably receives a window member 14 for reciprocal motion. The window is movable between a closed position in which it is fully extended relative to the door 10 as shown in FIG. 1, and an open position wherein the window is partially or fully recessed within the door 10. In the closed position, an upper edge part 16 of the window, when the same is properly positioned, sealingly engages a gasket 18 which is provided in an upper body panel such as a roof 20 (only partially shown in FIG. 1) of the vehicle.

In connection with the above-described window assembly, and in accordance with the invention, there is provided an adjustment mechanism or assembly 25 which is coupled with the track 12 for pivotally moving the same relative to the door 10. In particular, it will be seen that the track or guide channel 12 is attached at generally an upper end thereof to a pivot mechanism 26 so as to pivot generally about a pivot point or pivot axis 28. In order to achieve this pivotal motion in a controlled fashion, the adjustment mechanism 25 is coupled with an opposite end 30 of the track or guide channel 12 so as to bidirectionally move the same about the pivot point or pivot axis 28.

It will be noted, however, that at least a lower portion 22 of the window is held captive within the guide track or channel 12 at all times. Accordingly, the bidirectional movement of the end of guide channel 30 serves to pivot not only the guide channel 12 but also the window 14 relative to the pivot axis 28. This in turn permits adjustment of the angular position of window 14 so as to assure the proper sealing engagement relative to the gasket 18 when the window is extended to its closed position.

Preferably, and as will be seen more fully later herein, the window adjustment mechanism is designed to be accessible from the exterior of the vehicle. More particularly, the window adjustment mechanism is accessible for manipulation by a suitable tool 32 which may be inserted through an opening 34 provided therefor in the bottom lower portion of the door member or panel 10. Normally this opening is covered by a readily removable trim strip or member 36. Preferably, the tool engages a mating protion of a drive arrangement to be described hereinbelow for driving the end 30 of guide channel 12 bidirectionally relative to pivot axis 28.

Figure 3:
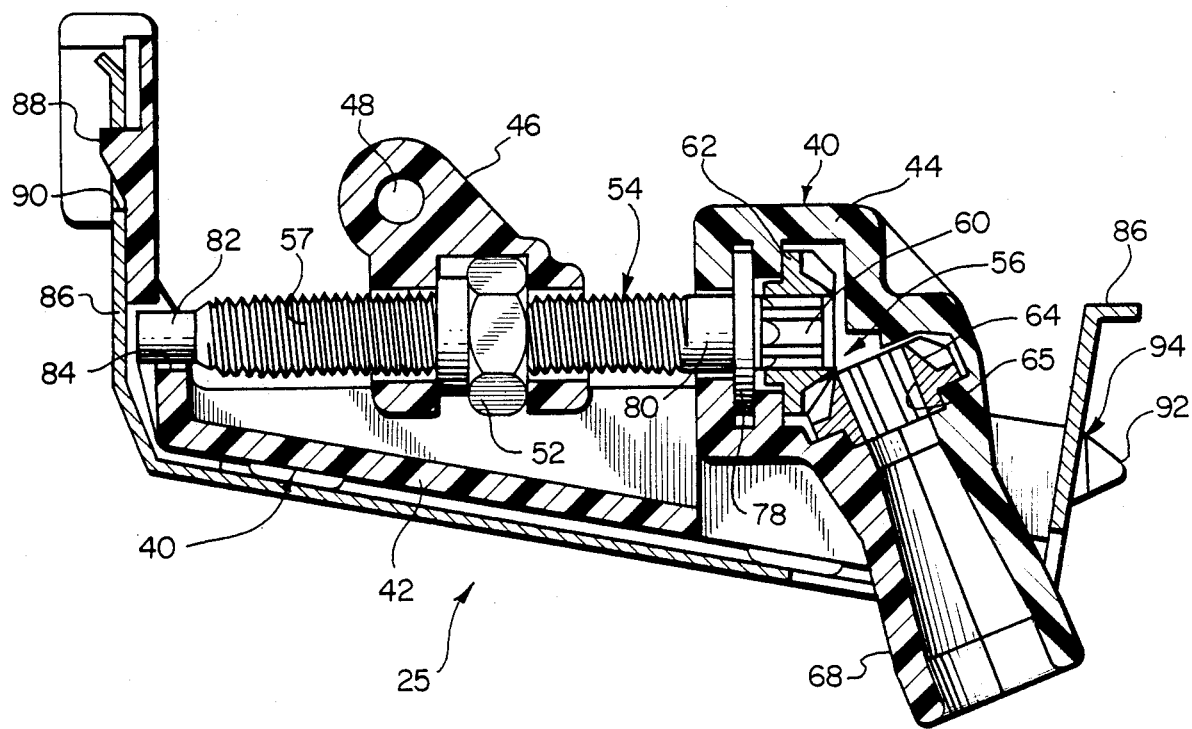
FIG. 3 is an enlarged sectional view taken generally along the line 3—3 of FIG. 2.

Referring now also to FIGS. 2 and 3, further details of the window adjustment mechanism or apparatus 25 are shown in accordance with a first and preferred embodiment of the invention. The apparatus of FIGS. 2 and 3 includes a housing means or member 40, which comprises a first housing member or base member or portion 42 and a second housing member or cover member or portion 44. This housing 40 partially houses a movably mounted channel coupling means or member 46 which includes means such as an elongate through bore 48 and mating fastener 50 for coupling to the guide channel 12 at end 30 thereof. It will be recognized that the apparatus 25 may be connected at any location remote from or at least removed somewhat from the end 24 of the guide channel which is mounted to the pivot point or pivot axis 28, without departing from the invention, however end 30 is a convenient point for this attachment.

A driven member 52 mounts the adjustment member 46 and is in turn drivable for achieving controlled bidirectional movement of member 46 relative to the housing 40 to achieve the desired bidirectional pivoting of the guide channel 12. In the illustrated embodiment, this movement is generally transverse to the elongate dimension of the guide channel 12 so as to pivot the same about the pivot point or axis 28 as best viewed in FIG. 1. Cooperatively, a drive member or drive means 54 is rotatably mounted to the housing 40 and includes a fastener-like portion of complementary form for mating with the driven member 52 so as to engage the same for achieving the above-described bidirectional movement in response to bidirectional rotation of the drive means 54. An engageable means or member 56 is provided for rotating the drive means by some means external to the vehicle, such as by the insertion and rotation of the driver tool 32 as generally indicated in FIG. 1.

In the embodiment illustrated in FIGS. 1 and 2, the driven member 52 comprises a fastener member which takes the form of a nut-like member having an internal bore (not seen in FIG. 3). The drive member includes an externally threaded elongate shaft or screw-like portion 57 which is configured for matingly engaging the bore of the nut-like member 52. In accordance with the preferred form of the invention, the nut 52 comprises a so-called Nylock-type nut—that is, one having a deformable inner sleeve of nylon or like material. Accordingly, the drive member thread 57 is configured as a thread-forming member so as to actually form a thread through the deformable sleeve of the member 52. This advantageously helps to define the prevailing torque between these members and to substantially avoid unintended rotational or threadable movement therebetween except in response to the intentional rotation of the drive member 54, such as in response to the tool 32. This prevents accidental misalignment of the track 12 due to forces such as might be experienced due to vehicle vibration or the like. The prevailing torque defined as just described hereinabove substantially prevents such unintentional changing of the position of the driven member 52 relative to drive member 54.

While the engageable means or member (as will be explained later with respect to the alternate embodiment shown in FIGS. 5 and 6) may be directly rotatable either by a tool or manually, in the preferred embodiment indicated in FIGS. 2 and 3, the driving by the drive tool 32 is done somewhat indirectly. More particularly, in the embodiment shown in FIGS. 2 and 3, the engageable member comprises a driver head portion 60 preferably a multilobular or Torx(TM)-type driver head which, in turn, nonrotatably engages a crown or bevel gear 62. A second mating crown gear 64 is provided at a suitable offset angle for optimum engagement between the teeth of respective crown or bevel gears 62 and 64. As will be seen with reference to FIGS. 3 and 4, the housing members 42, 44 provide suitable bearing support surfaces (70,72 and 74,76) for assuring the proper rotational support and engagement between these bevel gears 62, 64. The latter bevel gear member 64 is substantially identical to bevel gear member 62 in that each has a shaped or formed recess or interior 63, 65 for matingly receiving driver head portion 60 and a Torx(TM)-type driver head respectively. Preferably then, tool 32 is formed with such a mating Torx(TM)-type driver head so as to directly engage and rotate bevel gear 64.

In order to facilitate this engagement from outside of the vehicle, and in particular from exteriorly of the door 10, an elongate entry portion or sleeve-like projection 68 is formed on the housing 40. This projection 68 projects to the exterior opening 34 of the vehicle or body panel or door panel 10 which is normally covered by trim strip or member 36 as previously discussed with respect to FIG. 1. Accordingly, the elongate sleeve-like entry port is in alignment with the tool-engageable portion of bevel gear 64 to permit the ingress of a mating tool 32 for rotating the same.

Figure 4:
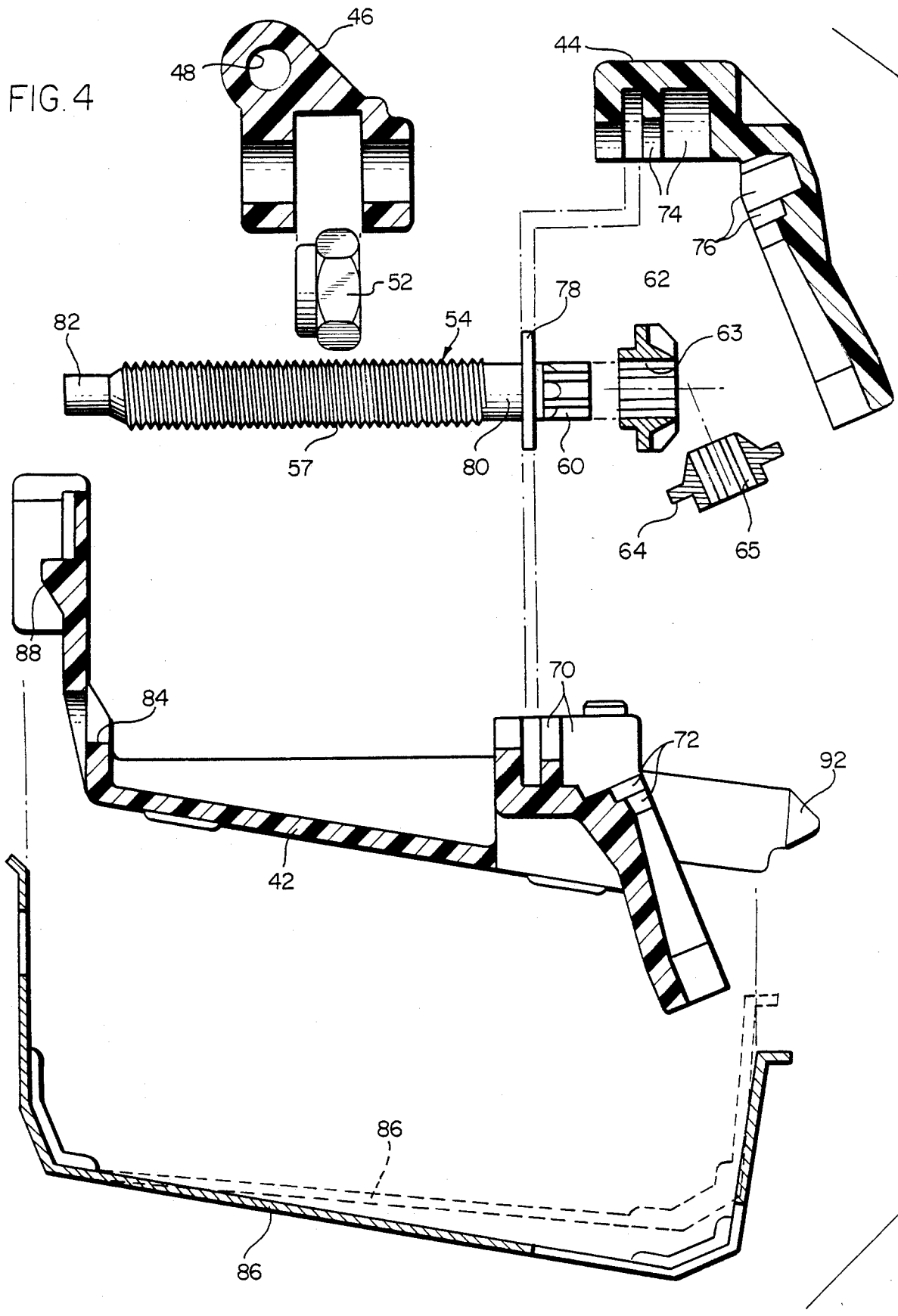
FIG. 4 is an exploded view of the apparatus of Figs. 2 and 3, indicating generally the various parts thereof and their assembly.

Referring now also to FIG. 4, further details of the preferred embodiment of FIGS. 2 and 3 will be next described. As previously noted, the housing comprises a base portion 42 which defines at least portions 70 and 72 of respective bearing surfaces for receiving and rotatably supporting the bevel gears 62 and 64 in engagement with each other as shown in FIG. 3. The second or cover portion 44 of the housing 40 defines remaining portions 74, 76 of these bearing surfaces or areas for rotatably receiving and supporting the respective bevel gears. Also it will be seen that cover portion 44 preferably provides a means for completely covering or enclosing the bevel gears and thereby holding the same in a relatively dust-free or dirt-free environment within the housing 40. Further to this end, some additional bearing support and sealing of the housing 40 against the ingress of dirt or the like in the region of the gears 62, 64 may be obained by the addition of a further washer-like or grommet member 78, which surroundingly engages and supports an unthreaded shank portion 80 of drive member 54 which is formed thereon generally intermediate the driver head portion 60 and threaded shaft portion 57. An opposite end portion 82 of the drive member 54 is of reduced diameter and unthreaded, in the illustrated embodiment, to rotatably mate with a complementary bearing surface 84 formed in an opposite end of the housing base portion 42.

The assembly 25 also includes a bracket member 86 for mounting the housing 40 within the door or other body panel 10. In the illustrated embodiment, the bracket 86 is preferably formed of a flexible or resilient and preferably a relatively thin metal material, such as by stamping or other metal forming operations. This forms a resilient bracket for resiliently flexing between an unstressed position as generally shown in phantom line in FIG. 4 and an assembled position as shown in solid line, wherein the housing member 40 is snappingly and releasably lockingly engaged therewith and mounted thereto. To this end, the bracket member 86 and the housing 40 are provided with respective cooperatively engageable tab and slot members or means 88, 90 and 92, 94 for encouraging a generally snapping, releasably locking engagement therebetween, as illustrated for example in FIG. 3.

Turning now briefly to FIG. 5, in accordance with an alternate embodiment of the invention, the engageable means 56 is formed as an enlarged crown gear 100 which has a gear tooth pattern formed for complementary engagement by a multilobular-type of driver tool such as Torx(TM) tool 32. The crown gear 100 may be engaged with drive member 54 in the same way as illustrated and described for bevel gear 62 in FIG. 3. Accordingly, in this embodiment, it will be seen that the crown gear 100 is directly engageable by the tool 32.

Turning to FIG. 6, the engageable means 56 is alternately formed as a radially enlarged knurled thumbwheel 102. That is, the thumbwheel 102 is of considerably greater diameter than that of the illustrated driver head 56 in FIG. 3. At least a portion of this diametrically, or radially enlarged thumbwheel projects outwardly of the door or body panel at the opening 34 so as to be directly manually engageable for rotation of the same manually. Preferably body panel 36 normally covers this projecting portion of the knurled thumbwheel in much the same way as it normally covers the projecting or end portion of the access port or sleeve 68 of FIG. 3. Thumbwheel 102 may also be mounted to drive means 54 in the same fashion as bevel gear 62 in FIG. 3.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A window adjustment apparatus for use with an automotive vehicle type of window assembly of the type having an elongate guide channel defining a longitudinal axis and which mounts a window for reciprocal motion relative to a vehicle body panel such as a vehicle door, and a pivot arrangement which mounts said guide channel for pivotal movement generally about one end thereof and within said vehicle body panel in which said guide channel is located, said window adjustment apparatus comprising: housing means; an adjustment member having channel-coupling means for coupling thereof to said guide channel at a location thereon generally remotely located from the end about which said guide channel is mounted for pivotal motion; a driven member mounted to said adjustment member; drive means rotatably mounted to said housing, said drive means being of complementary form with said driven member for engaging the same for causing bidirectional movement of said adjustment member relative to said housing to achieve said bidirectional pivoting of said guide channel in response to bidirectional rotation of the drive means; and engageable means for engagement and bidirectional rotation by means acting from exteriorly of the body panel and operatively coupled with said drive means, such that bidirectional rotation of the engageable means achieves a predetermined and corresponding amount of bidirectional pivotal motion of the guide channel; wherein said engageable means comprises a gear member nonrotatably coupled with said drive means; wherein said gear has a tool-engageable portion accessible for engagement and rotation by a mating tool; and wherein said housing includes an entry port in alignment with said tool-engageable portion of said gear for permitting the ingress of a mating tool for rotating the same.

2. Apparatus according to claim 1 wherein said driven member comprises a fastener member and wherein said drive means includes a mating fastener portion mounted to said housing for rotation about a given axis which crosses the axis defined by said guide channel, said mating fastener portion being of complementary form for mating with said fastener member for engaging the same for bidirectional movement of the fastener member in response to bidirectional rotation of the mating fastener portion; said driver head portion being nonrotatably coupled with said mating fastener portion.

3. Apparatus according to claim 2 wherein said driven member comprises a nut-like member having a deformable inner sleeve, and wherein said drive member mating fastener portion comprises a metal screw-type thread for forming a mating thread interiorly of said sleeve to thereby define the prevailing torque therebetween.

4. Apparatus according to claim 1 wherein said engageable means is directly engageable by a mating tool.

5. Apparatus according to claim 4 wherein said engageable means comprises a crown gear formed for complementary engagement by a multilobular-type driver tool.

6. Apparatus according to claim 1 wherein said engageable means comprises a radially enlarged knurled thumbwheel, at least a portion of which is accessible exteriorly of said body panel for manual engagement of the same for rotation manually.

7. Apparatus according to claim 1 and further including bracket means for mounting said housing means to an interior portion of said automotive body panel for cooperative association with said guide channel therewithin.

8. Apparatus according to claim 7 wherein said housing means and said bracket have cooperating mounting means formed thereon for releasable engagement therebetween.

9. Apparatus according to claim 8 wherein said bracket means is resiliently deformable and wherein said mounting means comprise cooperating tab and slot means on said housing and said bracket means for snapping releasable locking engagement therebetween.

10. A window adjustment apparatus for use with an automotive vehicle type of window assembly of the type having an elongate guide channel defining a longitudinal axis and which mounts a window for reciprocal motion relative to a vehicle body panel such as a vehicle door, and a pivot arrangement which mounts said guide channel for pivotal movement generally about one end thereof and within said vehicle body panel in which said guide channel is located, said window adjustment apparatus comprising: housing means; an adjustment member having channel-coupling means for coupling thereof to said guide channel at a location thereon generally remotely located from the end about which said guide channel is mounted for pivotal motion; a driven member mounted to said adjustment member; drive means rotatably mounted to said housing, said drive means being of complementary form with said driven member for engaging the same for causing bidirectional movement of said adjustment member relative to said housing to achieve said bidirectional pivoting of said guide channel in response to bidirectional rotation of the drive means; and engageable means for engagement and bidirectional rotation by means acting from exteriorly of the body panel and operatively coupled with said drive means, such that bidirectional rotation of the engageable means achieves a predetermined and corresponding amount of bidirectional pivotal motion of the guide channel; wherein said engageable means comprises a bevel gear member nonrotatably coupled with said drive means; and further including a mating bevel gear member mounted for rotation within said housing and mounting means formed in said housing for positioning the respective bevel gears for mating engagement therebetween; wherein said mating bevel gear has a tool-engageable portion accessible for engagement and rotation by a mating tool, and wherein said housing includes an entry port in alignment with said tool-engageable portion of said mating bevel gear for permitting the ingress of a mating tool for rotating the same.

11. Apparatus according to claim 10 wherein said housing means comprises a base portion defining at least portions of respective bearing surfaces for rotatably supporting the respective bevel gears and also for rotatably mounting said drive member, and a cover portion defining remaining portions of said bearing surfaces for supporting said bevel gears for rotation and also providing means for covering and enclosing said bevel gears.

12. A window adjustment apparatus for use with an automotive vehicle type of window assembly of the type having an elongate guide channel defining a longitudinal axis and which mounts a window for reciprocal motion relative to a vehicle body panel such as a vehicle door, and a pivot arrangement which mounts said guide channel for pivotal movement generally about one end thereof and within said vehicle body panel in which said guide channel is located, said window adjustment apparatus comprising: housing means; an adjustment member having channel-coupling means for coupling thereof to said guide channel at a location thereon generally remotely located from the end about which said guide channel is mounted for pivotal motion; a driven member mounted to said adjustment member; drive means rotatably mounted to said housing, said drive means being of complementary form with said driven member for engaging the same for causing bidirectional movement of said adjustment member relative to said housing to achieve said bidirectional pivoting of said guide channel in response to bidirectional rotation of the drive means; and engageable means for engagement and bidirectional rotation by means acting from exteriorly of the body panel and operatively coupled with said drive means, such that bidirectional rotation of the engageable means achieves a predetermined and corresponding amount of bidirectional pivotal motion of the guide channel; wherein said engageable means comprises a bevel gear member nonrotatably coupled with said drive means; and further including a mating bevel gear member mounted for rotation within said housing and mounting means formed in said housing for positioning the respective bevel gears for mating engagement therebetween, and wherein said housing means comprises a base portion defining at least portions of respective bearing surfaces for rotatably supporting the respective bevel gears and also for rotatably mounting said drive member, and a cover portion defining remaining portions of said bearing surfaces for supporting said bevel gears for rotation and also providing means for covering and enclosing said bevel gears.

13. A window adjustment apparatus for use with an automotive vehicle type of window assembly of the type having an elongate guide channel defining a longitudinal axis and which mounts a window for reciprocal motion relative to a vehicle body panel such as a vehicle door, and a pivot arrangement which mounts said guide channel for pivotal movement generally about one end thereof and within said vehicle body panel in which said guide channel is located, said window adjustment apparatus comprising: housing means; an adjustment member having channel-coupling means for coupling thereof to said guide channel at a location thereon generally remotely located from the end about which said guide channel is mounted for pivotal motion; a driven member mounted to said adjustment member; drive means rotatably mounted to said housing, said drive means being of complementary form with said driven member for engaging the same for causing bidirectional movement of said adjustment member relative to said housing to achieve said bidirectional pivoting of said guide channel in response to bidirectional rotation of the drive means; and engageable means for engagement and bidirectional rotation by means acting from exteriorly of the body panel and operatively coupled with said drive means, such that bidirectional rotation of the engageable means achieves a predetermined and corresponding amount of bidirectional pivotal motion of the guide channel; and further including bracket means for mounting said housing means to an interior portion of said automotive body panel for cooperative association with said guide channel therewithin; wherein said housing means and said bracket means have cooperating mounting means formed thereon for releasable engagement therebetween; wherein said bracket means is resiliently deformable and wherein said mounting means comprise cooperating tab and slot means on said housing and said bracket means for snapping releasable locking engagement therebetween.

* * * * *

UNITED STATES PATENT AND TRADEMARK OFFICE
CERTIFICATE OF CORRECTION

PATENT NO. : 4,956,942

DATED : September 18, 1990

INVENTOR(S) : Stephen P. Lisak and Harold L. Purdy

It is certified that error appears in the above-identified patent and that said Letters Patent is hereby corrected as shown below:

On the title page itme [73] Assignee: should read as follows:

--Ryder International Corp., Arab, Al., Textron Inc., Providence, Rhode Island--. (part interest)

Signed and Sealed this

Seventh Day of April, 1992

Attest:

HARRY F. MANBECK, JR.

*Attesting Officer*  *Commissioner of Patents and Trademarks*